(12) United States Patent
Flanders

(10) Patent No.: US 6,487,355 B1
(45) Date of Patent: Nov. 26, 2002

(54) MOUNTING AND ALIGNMENT STRUCTURES FOR OPTICAL COMPONENTS PROVIDING OPTICAL AXIS DIRECTION DEFORMATION

(75) Inventor: Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/712,115

(22) Filed: Nov. 14, 2000

Related U.S. Application Data

(63) Continuation-in-part of application No. 09/648,348, filed on Aug. 25, 2000.
(60) Provisional application No. 60/165,431, filed on Nov. 15, 1999, and provisional application No. 60/186,925, filed on Mar. 3, 2000.

(51) Int. Cl.⁷ .................................................. G02B 6/00
(52) U.S. Cl. ...................................................... 385/134
(58) Field of Search ................................. 385/134, 135, 385/136, 147

(56) References Cited

U.S. PATENT DOCUMENTS

| | | | |
|---|---|---|---|
| 4,691,586 A | * | 9/1987 | van Leijenhorst et al. .. 248/251 |
| 4,773,727 A | * | 9/1988 | Le Pivert et al. ............. 29/466 |
| 4,883,342 A | | 11/1989 | Ishii et al. .................. 350/320 |
| 5,859,947 A | * | 1/1999 | Kiryuscheva et al. ........ 356/153 |
| 6,074,103 A | * | 6/2000 | Hargreaves et al. ......... 385/147 |

FOREIGN PATENT DOCUMENTS

WO    WO96/08749    *   3/1996   ............. G03F/7/00

OTHER PUBLICATIONS

Lorenz, H., "Photo–Fabrication of Ultra–Precise Micromolds," www.mimotech.ch 9/01, Mimotec SA, Blancherie 63, CH–1950 SION.

* cited by examiner

Primary Examiner—Tulsidas Patel
(74) Attorney, Agent, or Firm—Grant Houston

(57) ABSTRACT

A mounting and alignment structure of an optical component has an optical element interface. Optical elements, such as lenses or fibers are attached to the mounting structure at this interface. The structure further comprises a base. The base forms the part of the structure that is generally attached to an optical bench or other submount, for example. Armatures extend between the base and the interface to allow for deformation or alignment of the optical structure in a plane that is orthogonal to an optical axis. The base further includes an upper support, a lower support, and a link extending between the upper and lower support. In the preferred embodiment, this link allows the mounting structure to be deformed in a direction at least partially parallel to the optical axis. Thus, when a lens optical element is mounted on the mounting structure, a position of the focal point of the beam being transmitted through the lens can be controlled in a direction along the optical axis.

16 Claims, 5 Drawing Sheets

US 6,487,355 B1

MOUNTING AND ALIGNMENT STRUCTURES FOR OPTICAL COMPONENTS PROVIDING OPTICAL AXIS DIRECTION DEFORMATION

RELATED APPLICATION

This application is a Continuation-in-Part of U.S. application Ser. No. 09/648,348, filed on Aug. 25, 2000, and claims the benefit of the filing date of: 1) U.S. Provisional Application No. 60/165,431, filed Nov. 15, 1999; and 2) U.S. Provisional Application No. 60/186,925, filed Mar. 3, 2000. The teachings of each of these three applications are incorporated herein by this reference in their entirety.

BACKGROUND OF THE INVENTION

Component alignment is of critical importance in semiconductor laser system and/or MOEMS (micro-optical electromechanical systems) manufacturing. The basic nature of light requires that light generating, transmitting, and modifying components must be positioned accurately with respect to one another, especially in the context of free-space-interconnect optical systems, in order to function properly and effectively in electro-optical or all optical systems. Scales characteristic of semiconductor and MOEMS can necessitate micrometer to sub-micrometer alignment accuracy.

Consider the specific examples of coupling light from a semiconductor diode laser, such as a pump laser, to a core of a single mode fiber or coupling light into and out of a semiconductor optical amplifier (SOA). Only the power that is coupled into the fiber core is usable to subsequent system, such as a fiber amplifier or a detector in the case of an SOA. In the context of the SOA, input light must further be focused onto an input facet to provide a signal to be amplified.

One alignment technique that has been proposed for free-space-interconnect optical systems is to mount lenses on deformable mounting structures. Such systems enable the semiconductor laser system to be constructed and then later aligned to maximize coupling efficiencies.

SUMMARY OF THE INVENTION

One problem that arises with these proposed mounting structures is that they do not provide for alignment in the direction of the optical axis. Typically, they are configured such that they are deformable in a plane that is perpendicular to the optical axis. This is useful for many forms of alignment where the axis of the beam must be vertically and horizontally aligned relative to the optical bench on which the structure is installed. Additional degrees of freedom, however, are required when controlling the cross-sectional characteristics, such as when focusing the beam to couple it into a semiconductor chip or tunable filter.

In general, according to one aspect, the invention features a mounting and alignment structure of an optical component. The structure has an optical element interface. Optical elements, such as lenses or fibers are attached to the mounting structure at this interface.

The structure further comprises a base. The base forms the part of the structure that is generally attached to an optical bench or other submount, for example. Armatures extend between the base and the interface to allow for deformation or alignment of the optical structure in a plane that is orthogonal to an optical axis.

According to the present invention, the base further includes an upper support, a lower support, and a link extending between the upper and lower support.

In the preferred embodiment, this link allows the mounting structure to be deformed in a direction at least partially parallel to the optical axis. Thus, when a lens optical element is mounted on the mounting structure, for example, a position of the focal point of the beam being transmitted through the lens can be controlled in a direction of the optical axis.

In a preferred embodiment, two links are provided, each extending between the upper support and the lower support. One of these links is on a proximal side of the structure and the other is on a distal side of the structure.

In the present embodiment, these links form a hollow tubular flexion. The axis of this flexion extends in a direction parallel to the bench to which the mounting and alignment structure attaches, and in a direction that is orthogonal to a plane that is perpendicular to the bench and passes through the optical axis.

In general, according to another aspect, the invention also features a method for manufacturing a mounting structure of an optical component. This method comprises patterning a base resist layer to form a foundation mold for the optical element interface, at least one armature, and a portion of the base. This foundation mold is then filled with bulk material. A link resist layer is then patterned and developed to form a link mold on the bulk material. This link mold is then filled with bulk material to form an additional portion, or link, of the base.

In the preferred embodiment, a second link mold is further made and filled to form a second link.

Preferably, the system utilizes the LIGA process. LIGA is a German acronym for lithography, plating, and molding. Specifically, the foundation resist layer is usually PMMA. It is exposed using X-rays from a synchrotron, for example. The resist layer is then later developed and filled, using a plating or electroforming process with a nickel or gold bulk material.

In general, according to still another aspect of the invention, a method for positioning a mounting and alignment structure on optical bench is featured. This comprises forming a mounting structure comprising a component interface, at least one base, and at least one armature connecting the component to the base. An optical component alignment feature is formed on the base of the mounting structure. Further, a bench alignment feature is formed on the bench. The mounting structure of the optical bench is then mated to the component alignment feature.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
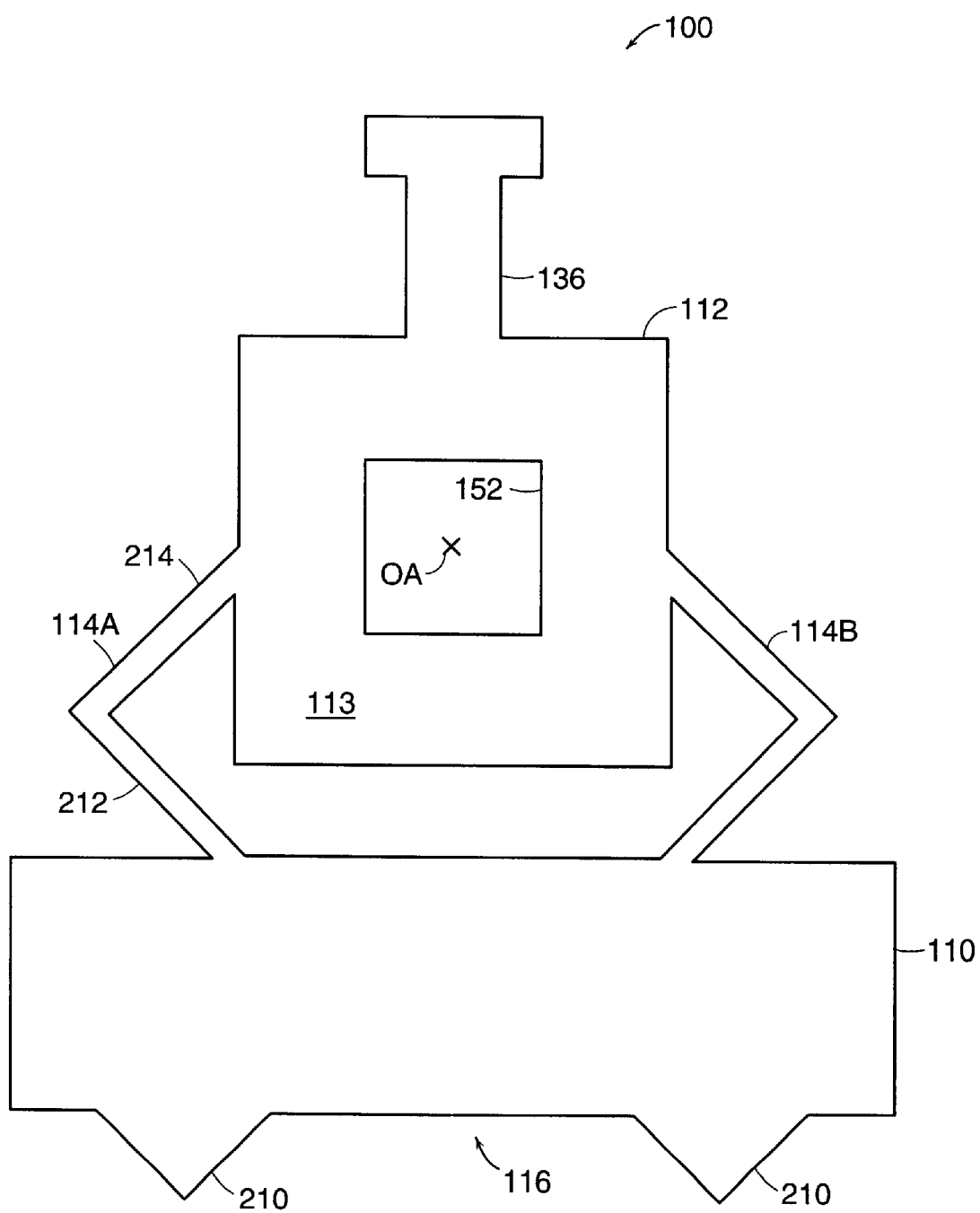
FIG. 1 is a front elevation view of the mounting and alignment structure according to the present invention.

FIG. 1 shows a mounting and alignment structure 100, which has been constructed according to the principles of the present invention.

The structure comprises a base 110 and a generally laterally-extending base surface 116. An optical component interface 112 has an optical port 152. A handle 136 extends vertically upward from the interface 112. Typically, an optical element such as a lens is bonded to bonding surface 113 via solder bonding, for example. In contrast, fibers are typically bonded to the interior of the port. In each case, the optical axis OA is defined by the element and extends in a z-axis direction that is orthogonal to the front face of the structure 100.

V-shaped alignment features 210 are provided on the base surface for engaging complementary V-shaped alignment trenches in an optical bench, to which the structure is attached.

Two armatures 114A and 114B connect the base 110 with the interface 112. Each armature 114A, 114B comprises two diagonally extending segments 212, 214 that intersect substantially at a right angle with respect to each other.

Figure 2:
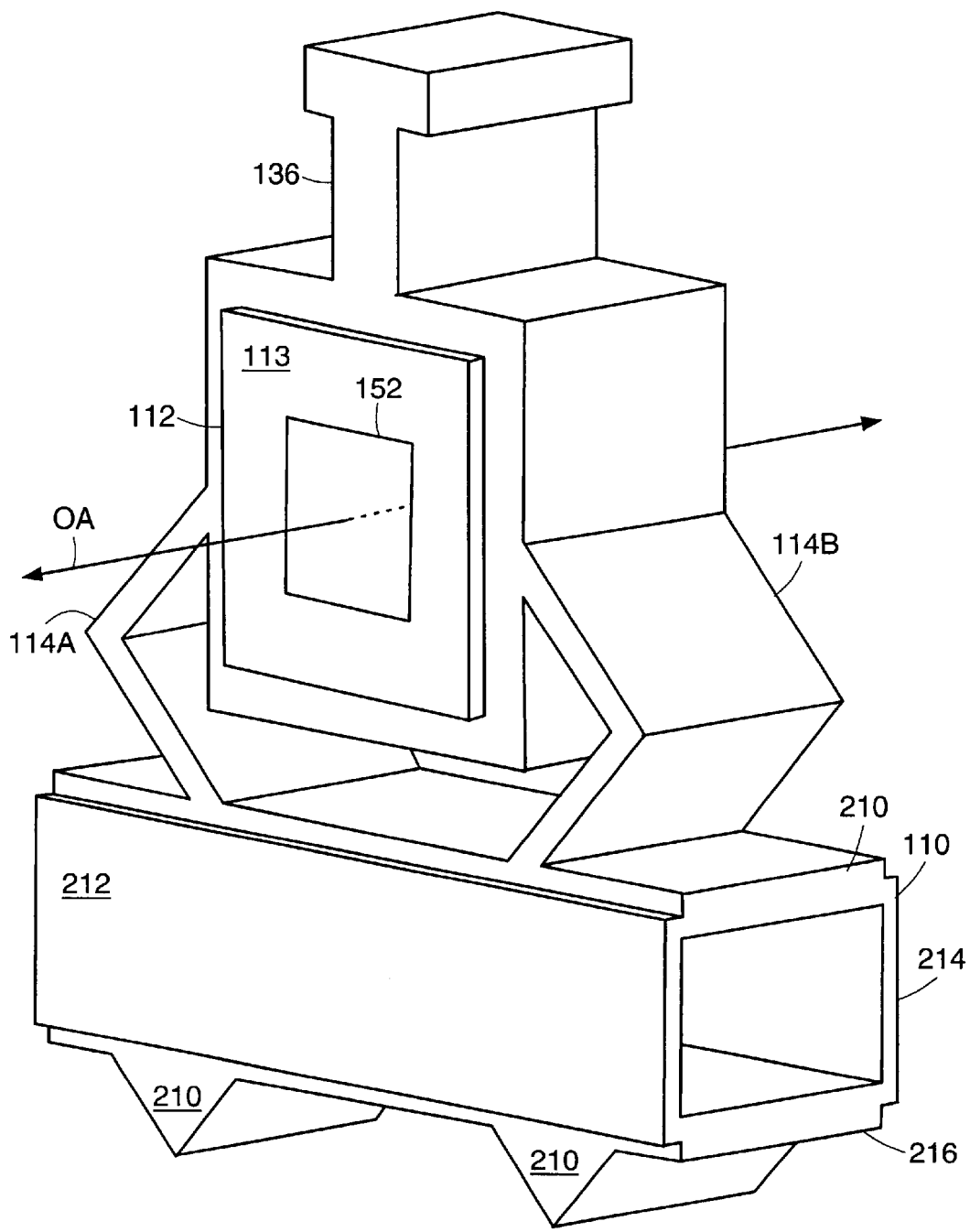
FIG. 2 is a perspective view of the inventive mounting structure.

FIG. 2 illustrates the construction of the base 110. Specifically, the base comprises an upper transverse support 210. The left and right armatures 114A-114B terminate on this upper support. A proximal link 212 and a distal link extend down from the upper support 210 to a lower transverse support 216. The V-shaped alignment features 210 extend downward from this lower transverse support.

Figure 3:
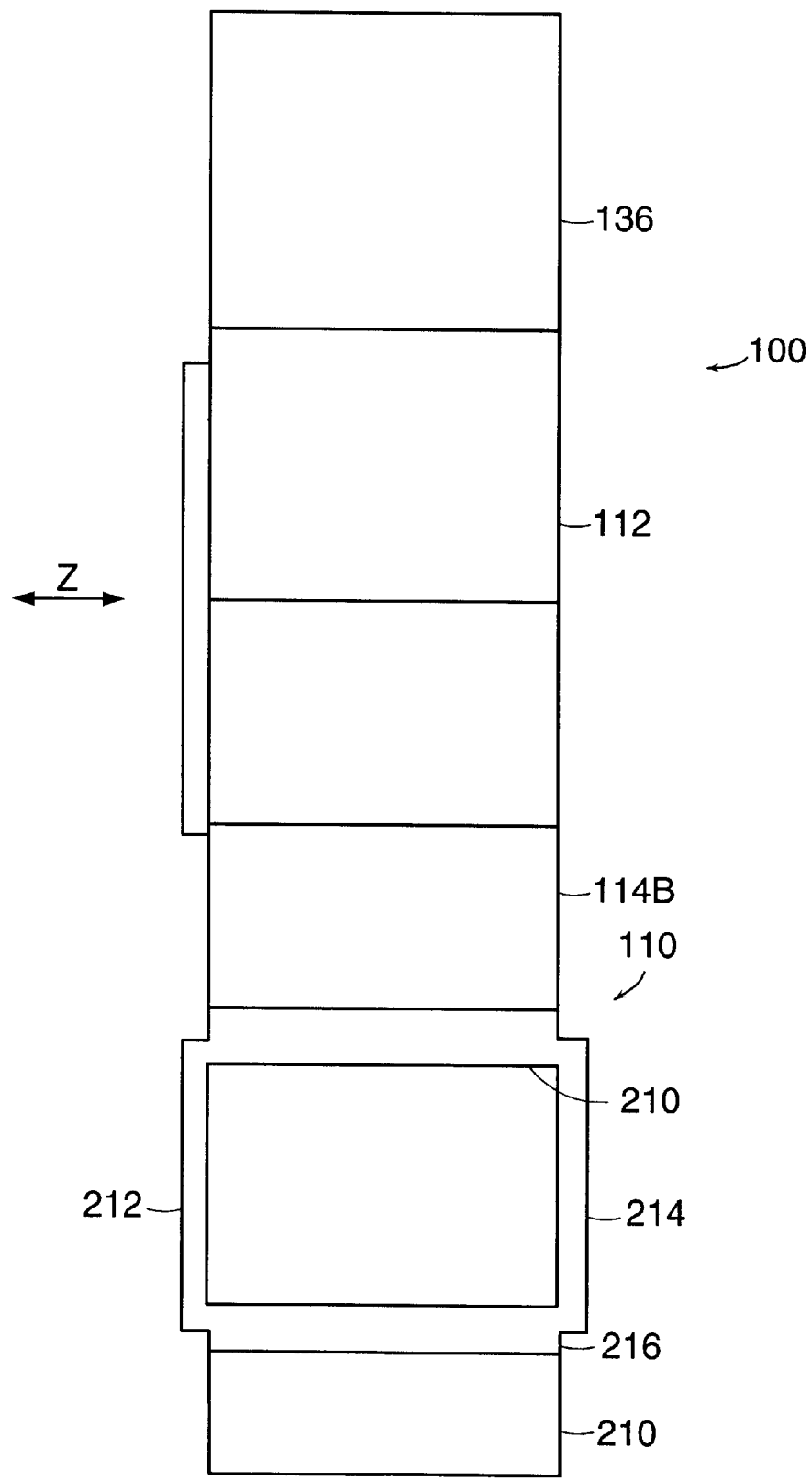
FIG. 3 is a side elevation view of the inventive mounting structure.

FIG. 3 further illustrates the configuration of the base 110. Specifically, the upper support 210, the lower support 216, and the proximal and distal links 212, 214 form a generally rectangular hollow tubular flexion. This flexion allows z-axis flexing, flexing in a direction of the optical axis, of the alignment structure 100 so that an optical component installed on the interface 112 can be aligned along the Z-axis. Specifically, the proximal and distal links deform to convert the generally rectangular flexion into a parallelogram shape to provide for z-axis positioning.

FIGS. 4A–4I are cross-sectional views of the mounting and alignment structures 100 during the manufacturing process specifically showing the manufacturing process for the base 110.

Figure 4A:
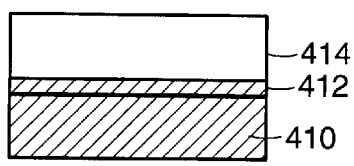
FIGS. 4A-4I illustrate a process for manufacturing the mounting structure and specifically, the links of the base, according to the present invention.

Specifically, as illustrated in FIG. 4A, a thick PMMA resist layer 414 is bonded to a seed/release layer 412 on a substrate 410.

The depth d of the PMMA layer 414 determines the approximate maximum thickness of the subsequently manufactured structure 100. In the preferred embodiment, the depth and consequently Z-axis thickness of the mounting and alignment structures is in the range of 500–1000 micrometers.

Figure 4B:
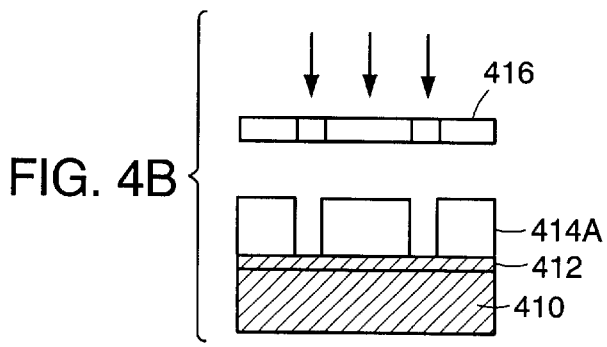

FIG. 4B illustrates the next fabrication step of the mounting and alignment structure 100. Specifically, the thick PMMA resist layer is patterned by exposure to collimated x-rays. Specifically, a mask 416, which is either be a positive or negative mask having the desired pattern for the structure, is placed between the x-ray source such as a synchrotron and the PMMA layer 414. The PMMA layer 414 is then developed into the patterned layer 414A as illustrated in FIG. 4B.

Figure 4C:
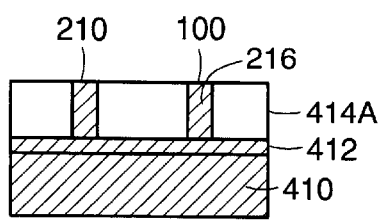

FIG. 4C shows the formation of upper and lower supports 210, 216 and other features of the structure such as armatures 114 and the interface 110. Specifically, in the preferred embodiment, the bulk material of the structure 100 is deposited in the mold of the PMMA via electroplating. The preferred plating metal includes nickel according to the present embodiment. Nickel alloys, such as a nickel-iron alloy, are used in embodiments. Alternatively, gold or a gold alloy is used in still other embodiments. Other alternative metals and alloys include: silver, silver alloys, nickel copper, nickel cobalt, gold cobalt and alloys laden with colloidal oxide particles to pin the microstructures.

Figure 4D:
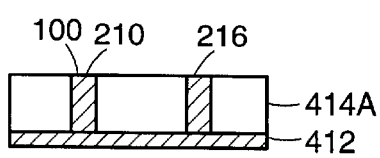

As illustrated in FIG. 4D, after the first plating process, the substrate 410 is removed from the seed layer 412. Thereafter, an additional photoresist 420 layer is coated and then patterned as illustrated in FIG. 4E to form a mold for one link of the z-axis flexure. Thereafter, a further electroplating step is performed to fabricate the link 212 as illustrated in FIG. 4F.

Figure 4G:
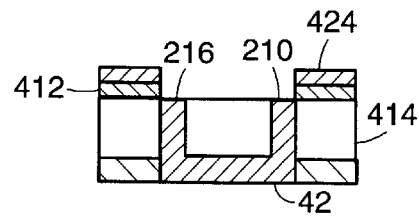
Figure 4E:
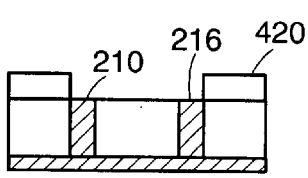
Figure 4H:
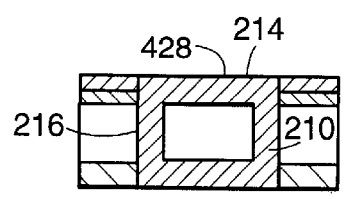
Figure 4F:
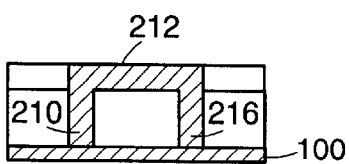
Figure 4I:
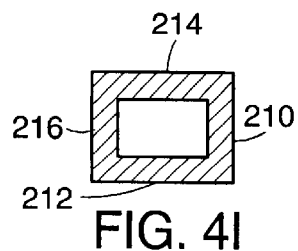

In FIG. 4G, a second photoresist 424 is formed and then patterned on the reverse side of the structure 100 and PMMA layer 414. The etching is performed through the seed layer 412. Another plating step is performed into the mold of the second link as illustrated in FIG. 4H. Thereafter, as illustrated in FIG. 4I, the remaining photoresist layer 424, seed layer 412, and PMMA layer 414 are removed leaving the hollow box-shaped flexion structure illustrated. This box shaped structure forms the base section 110 of the mounting and alignment structure.

Figure 5:
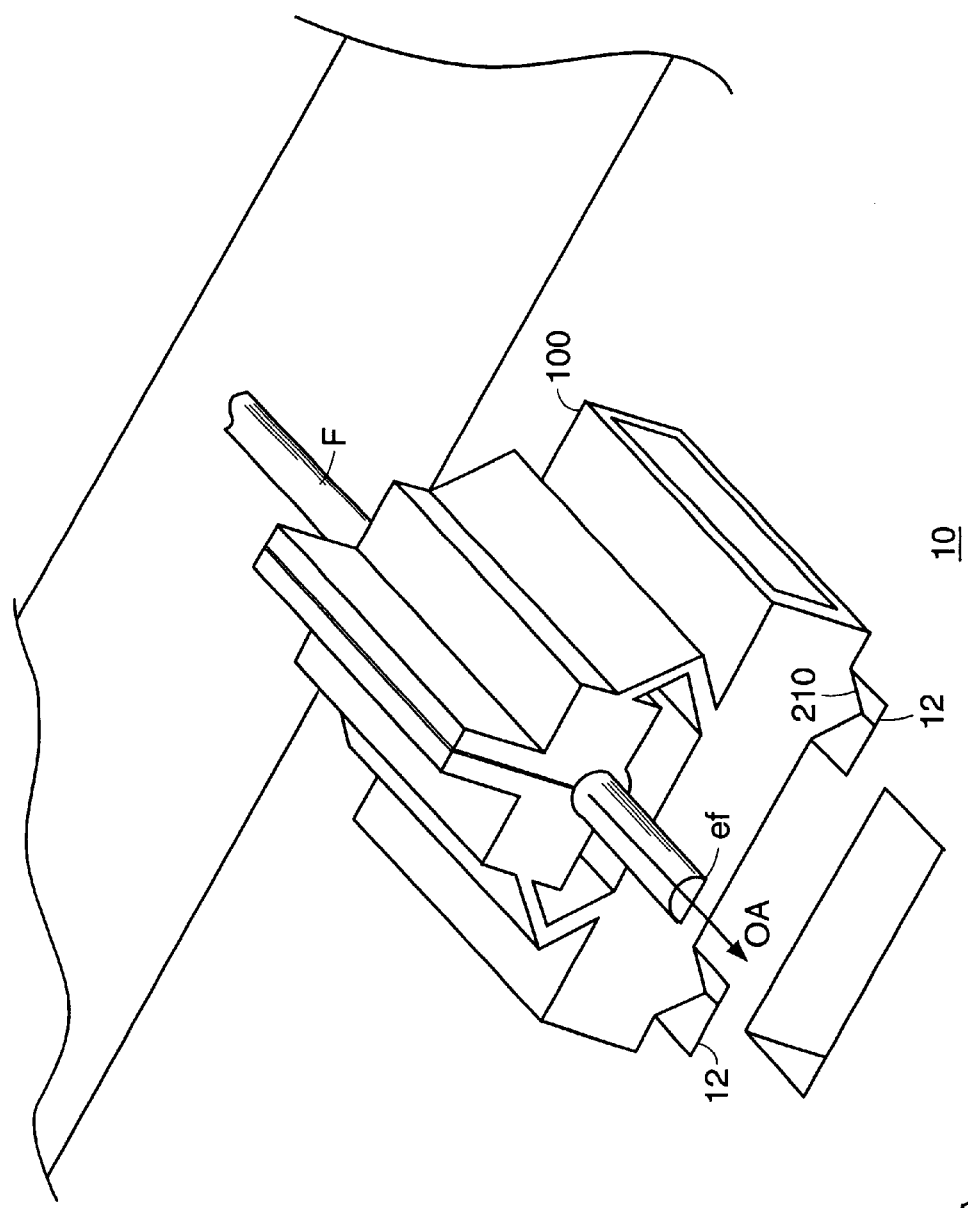
FIG. 5 is a perspective view showing the installation of the mounting and alignment structure on a bench and the mating of component alignment features with bench alignment features.

FIG. 5 shows the installation of the mounting and alignment structure 100 on a bench 10. This structure has optical fiber f inserted into its optical port so that the fiber's endface ef is secured in a stable relationship with the bench 10.

The mounting and alignment structure 100 is installed using the V-shaped alignment features 210. Specifically, V-shaped trenches or troughs 12 are formed in the surface of the bench 10 based upon the intended location for the mounting and alignment structure 100. The mounting and alignment structure is then installed on these trenches 12, such that the V-shaped alignment features extend into the trenches to therefore locate the alignment structure 100 on the bench surface. A solder reflow step is then preferably used to permanently attach the structure 100 to bench 10.

While this invention has been particularly shown and described with references to preferred embodiments thereof, it will be understood by those skilled in the art that various changes in form and details may be made therein without departing from the scope of the invention encompassed by the appended claims.

What is claimed is:

1. A mounting and alignment structure of an optical component, comprising:

an optical element interface for receiving an optical element defining an optical axis;

at least one base; and at least one armature connecting the component interface with the base, the at least one armature enabling positioning of the optical element relative to the base in a plane that is orthogonal to the optical axis;

a link connecting the component interface with the base, the link enabling positioning of the optical element relative to the base along the optical axis.

2. A mounting and alignment structure as claimed in claim 1, wherein the base includes an upper support and a lower support with the link extending between the upper support and the lower support, and wherein the upper support, the lower support, and the link form a flexion.

3. A mounting and alignment structure as claimed in claim 1, wherein the base includes an upper support and a lower support, the structure further comprising two links extending between the upper support and the lower support on a proximal and distal side of the structure, respectively.

4. A mounting and alignment structure as claimed in claim 3, wherein the upper support, the lower support, the proximal link, and the distal link form a hollow tubular flexion.

5. A mounting and alignment structure as claimed in claim 4, wherein an axis of the tubular flexion extends in a direction parallel to a bench to which the mounting and alignment structure attaches and in a direction orthogonal to a plane that is perpendicular to the bench and passes through the optical axis.

6. A mounting and alignment structure as claimed in claim 4, wherein the flexion deforms to enable adjustment of the optical element on the interface in a direction of the optical axis.

7. A mounting and alignment structure as claimed in claim 1, wherein the link deforms to enable adjustment of the optical element on the interface in a direction of the optical axis.

8. A method for manufacturing a mounting structure of an optical component comprising:
   patterning a base resist layer to form a foundation mold for an optical element interface and a portion of the base;
   filling the foundation mold with a bulk material of the mounting structure;
   depositing and patterning a link resist layer to form a link mold on the bulk material in the foundation mold; and
   filling the link mold with bulk material to form a link of the base, the link enabling positioning of optical element on the optical element interface relative to the base along the optical axis.

9. A method as claimed in claim 8, further comprising forming a second link mold and filling the link mold with additional bulk material to form a second link.

10. A method as claimed in claim 8, wherein the step of patterning the resist layer comprises selectively exposing the resist layer to x-rays.

11. A method as claimed in claim 8, wherein the step of patterning the resist layer further comprises developing the resist layer to form the foundation mold.

12. A method as claimed in claim 8, wherein the step of filling the mold comprises plating the bulk material into the mold.

13. A method as claimed in claim 8, wherein the bulk material comprises nickel.

14. A method as claimed in claim 8, wherein the bulk material comprises a nickel alloy.

15. A method as claimed in claim 8, wherein the bulk material comprises gold.

16. A method for positioning a mounting and alignment structure on an optical bench, the method comprising:
   forming a mounting structure comprising a component interface, at least one base; and at least one armature connecting the component interface with the base;
   forming component alignment feature on the base of the mounting structure;
   forming a bench alignment features on the optical bench; and
   positioning the mounting structure on the optical bench by mating the component alignment feature with the bench alignment feature.

* * * * *